No. 692,635. Patented Feb. 4, 1902.
J. M. DECKER.
TIRE SETTING MACHINE.
(Application filed Apr. 24, 1901.)

(No Model.) 3 Sheets—Sheet 1.

WITNESSES: INVENTOR
John M. Decker
BY
ATTORNEYS

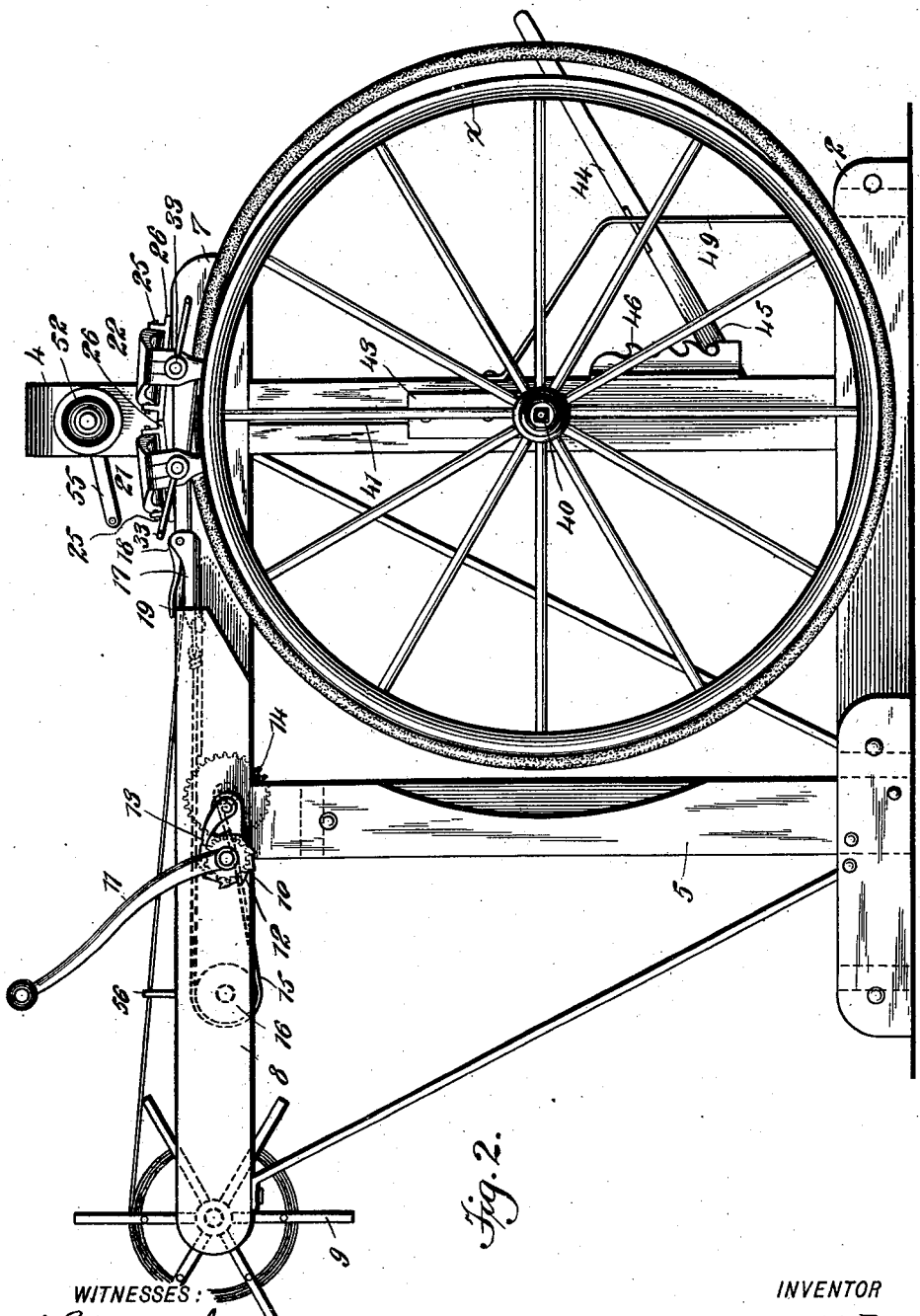

No. 692,635. Patented Feb. 4, 1902.
J. M. DECKER.
TIRE SETTING MACHINE.
(Application filed Apr. 24, 1901.)

(No Model.) 3 Sheets—Sheet 3.

WITNESSES:
A. R. Appleman
C. R. Ferguson

INVENTOR
John M. Decker
BY
ATTORNEYS

THE NORRIS PETERS CO., PHOTO-LITHO., WASHINGTON, D. C.

UNITED STATES PATENT OFFICE.

JOHN M. DECKER, OF KINGSTON, OHIO, ASSIGNOR OF ONE-HALF TO JOHN O. BLACK, NOLAN L. GARTNER, AND SHANNON R. SIBRELL, OF KINGSTON, OHIO.

TIRE-SETTING MACHINE.

SPECIFICATION forming part of Letters Patent No. 692,635, dated February 4, 1902.

Application filed April 24, 1901. Serial No. 57,268. (No model.)

*To all whom it may concern:*

Be it known that I, JOHN M. DECKER, a citizen of the United States, and a resident of Kingston, in the county of Ross and State of Ohio, have invented a new and Improved Tire-Setting Machine, of which the following is a full, clear, and exact description.

This invention relates to improvements in machines for setting rubber tires on wheels and which are held by a metal band extended through the tire; and the object is to provide a machine for this purpose by means of which the tire may be quickly set or applied without removing the wheel from the machine and with which the tire may be made even and smooth at all parts of the wheel.

I will describe a tire-setting machine embodying my invention and then point out the novel features in the appended claims.

Reference is to be had to the accompanying drawings, forming a part of this specification, in which similar characters of reference indicate corresponding parts in all the figures.

Figure 1:
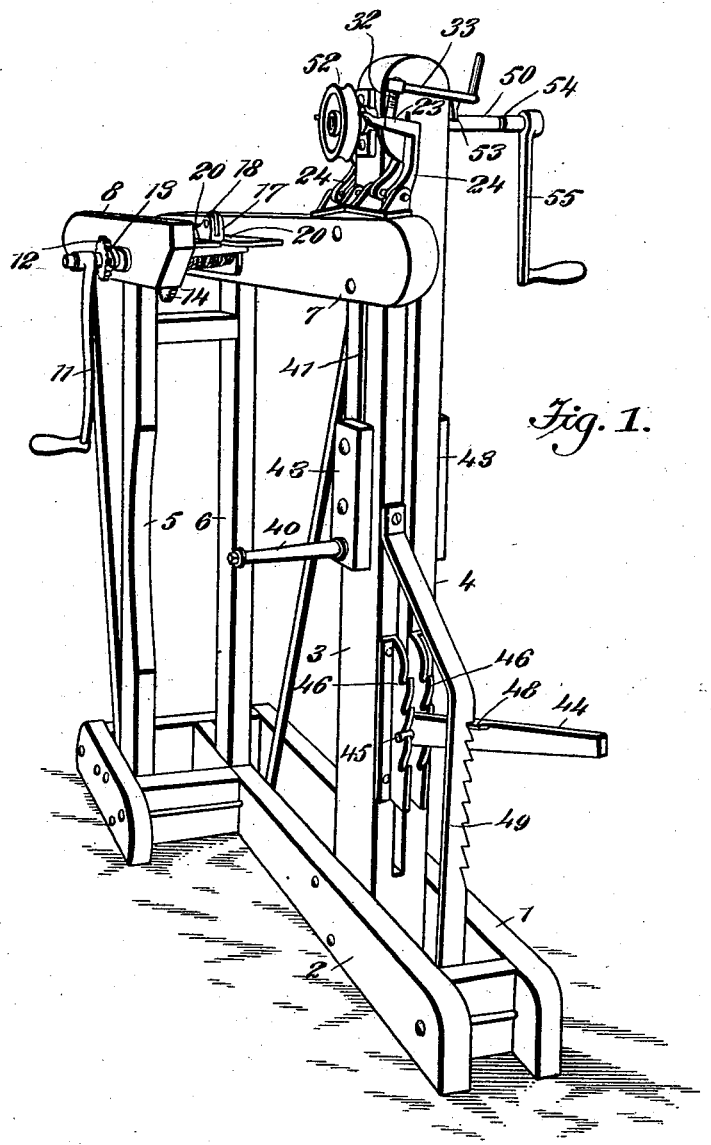
Figure 5:
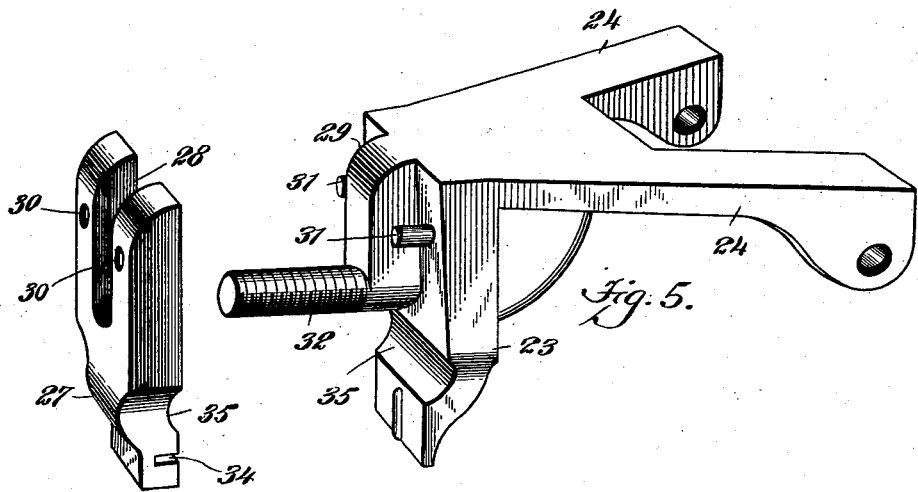
Figures 4, 6:
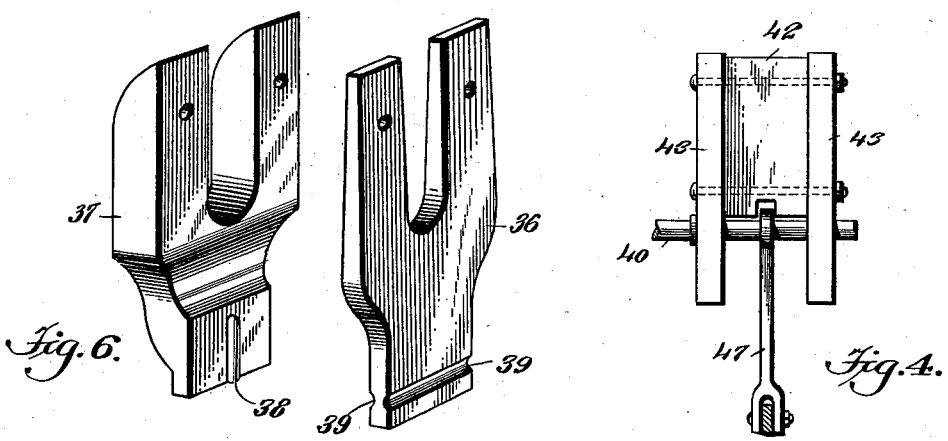
Figure 3:
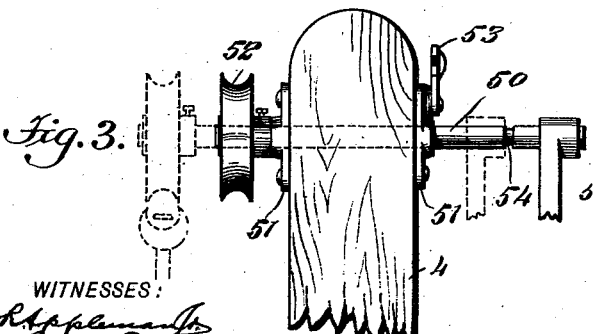

Figure 1 is a perspective view of a tire-setting machine embodying my invention. Fig. 2 is a side elevation of the same. Fig. 3 is a detail view showing an adjustable smoothing-wheel. Fig. 4 is a detail view showing a slide for supporting the vehicle-wheel upon which the tire is to be applied. Fig. 5 is a perspective view of clamping-jaws employed, and Fig. 6 is a perspective view of clamps that may be used for a round wire fastening-band instead of a flat band.

The machine-frame comprises base-beams 1 2, front standards 3 4, and rear standards 5 6. These several parts may be suitably secured together and braced by bolts or otherwise. Extended from the upper portion of the standard 3 and the standard 6 is a top bar 7, and extended parallel with said top bar 7 and from the upright or standard 5 is a short top bar 8. Mounted to rotate at the rear end of the top bars 7 and 8 is a reel 9, from which a fastening band or wire is to be supplied. A pinion 10 is mounted on a shaft having bearings in the bars 7 and 8, and on the shaft of this pinion is a crank-handle 11, and also on the shaft of the pinion is a ratchet-wheel 12, designed to be engaged by a pawl 13, and the pinion 10 meshes with a gear-wheel 14, the shaft of which forms a winding-drum for a cable or rope 15, the said cable or rope 15 being attached at one end to the shaft of the gear-wheel 14 and passing rearward and around a pulley 16, and thence forward to a gripping device for the fastening band or wire. This gripping device consists of a box-like portion 17, in which a clamping-head 18 is eccentrically mounted, the clamping-head being provided with a lever or handle 19. This gripping device is mounted to slide between guides 20.

Mounted on the machine forward of the gripping device are clamping devices 21 and 22, one forward of the other. Each of said clamping devices consists of an inner jaw 23, from the upper end of which arms 24 extend rearward and are mounted to swing on a rod 25, these rods being supported in castings 26, attached to the upper side of the top bar 7. On the forward side of the jaw 23 a jaw-section 27 is movable. This jaw-section 27 has a slot or recess 28 to receive an angular lug 29, extended forward from the jaw 23, and this jaw-section 27 is also provided with holes 30 to receive pins 31, extended from the jaw 23 at opposite sides of the lug 29. Extended from the lower end of the lug 29 and adapted to pass through the opening 28 is a threaded bolt 32, with which an internally-tapped clamp-lever 33 is designed to engage. The jaw-section 27 is provided at its inner face and extended transversely thereof with a slot 34, through which a flat fastening-band may pass, and each of the jaw-sections is provided with a transverse channel 35, the said channels when the jaws are together forming substantially a round opening.

The jaws above described are designed for use when a flat band is employed for securing the tire. When a round or wire-like fastening-band is employed, I may use an auxiliary inner jaw 36 and an outer jaw 37, somewhat similar to the jaw 27, but having at its lower end a vertical channel 38 to receive the end of a wire, while the auxiliary jaw-section 36, which is to be placed upon the pins 31, is provided at its lower end with half-round channels 39.

The wheel x, to which the tire is to be attached, is designed to be supported upon a spindle 40. This spindle 40 extends through vertical slots 41, formed in the standards 3 and 4, and between said standards and extended into the slots is a slide-plate 42, to the opposite edges of which cheek pieces or blocks 43 are bolted. These cheek pieces or blocks are designed to bear upon the outer surfaces of the standards 3 and 4, as clearly indicated in Fig. 1. The object in employing the slide-plate is so that the device may be adjusted for different sizes of vehicle-wheels and also that the wheel after the tire is placed thereon may be moved up into engagement with a smoothing roller or wheel to be hereinafter described.

As a means for raising the slide-plate carrying the wheel I employ a hand-lever 44, which has a pin 45 extended through it and that may be fulcrumed in any of the opposite notches formed in fulcrum-plates 46, attached to the standards 3 and 4, and between the inner end of this lever 44 and the spindle 40, at its portion below the slide-plate 42, is a link 47. The lever may be held in its adjusted position by engaging a plate 48 on the lever with any one of the teeth of a fixed rack 49.

Mounted in the upper portion of the standard 4 is a shaft 50, which has bearings in boxings 51, attached to the opposite sides of said standard. This shaft is movable lengthwise through the standard and boxings, so as to bring a finishing or pressing roller 52 on said shaft in line with the tire on the wheel, as indicated in dotted lines in Fig. 3, or it may be moved in the opposite direction to free it from the tire. To hold the shaft with the roller 52 in adjusted position for operation, I employ a latch 53, pivoted to one of the boxings 51 and designed to engage in a channel 54, formed in the shaft 50. This shaft is provided with a crank-handle 55.

After placing a tire on a wheel the wheel is to be placed upon the spindle 40 and with forty or fifty pounds of fastening-band on the reel 9, said band being in one continuous length. The end of the band is to be passed underneath a guide 56, drawn through the gripping device 17, thence through the opening 35 in the clamp 21, and thence through the slot 34 of the clamp 22. Now the band is pulled through and passed through the rubber tire. Then the end of the band is carried around under the wheel and into the slot 34 of the clamp 21 and clamped fast by turning the clamping-lever 33. After this the gripping-head 18 is to be forced downward to firmly grip the band. At this time the band will be firmly held by the gripping device and by the clamp 21, so that the clamp 22 may be now loosened, and upon turning the crank 11 the rope or cable 15 will be wound upon its drum, having the gear-wheel 14, drawing the gripping device rearward, which tightens the band, and it may be held by engaging the pawl 13 with the ratchet-wheel 12. At this time the end of the rubber tire will be against the jaws or clamps 22 and the opposite end of the tire will be against the clamp 21. The band material between the two clamping devices will be overlapped, and through these overlapped portions suitable rivets are to be passed, after which the band may be cut. Before doing this, however, the clamp 22 should be tightened, or, if preferred, after tightening the clamp 22 the gripping device may be loosened and the band cut off before riveting. The tire is now fast on the wheel and the clamping devices may be released and swung back, as indicated in Fig. 1. To bring the ends of the rubber tire together at the riveted portion of the band, the roller 52 is to be moved outward over the wheel. Then by pressing down on the lever 44 the wheel will be raised to engage the tire with the roller 52, so that upon a rotation of the said roller 52 the rubber tire will be uniformly stretched as the wheel x turns around, and eventually the two ends of the tire will be drawn closely together. In practice I have found it best to cut the rubber tire to be applied from ten to thirty inches longer than the circumference of the wheel.

It will be seen that in using this machine after placing the wheel thereon it is not removed until the tire is in a finished condition on the wheel.

Having thus described my invention, I claim as new and desire to secure by Letters Patent—

1. A machine for setting rubber tires, comprising a frame, a supply device for a fastening-band, a gripper for engaging with the fastening-band, means for drawing said gripper to tighten the band, a pair of clamps mounted on the frame for engaging with the tightening-band, a shaft adjustable longitudinally in the frame and a presser-roller on the shaft, substantially as specified.

2. A machine for setting rubber tires, comprising a frame, a gripping device movable on the frame for tightening a fastening-band, a pair of clamps mounted to swing on the frame and adapted for engagement with the fastening-band, a longitudinally-adjustable shaft over said clamping devices, and a smoothing-roller on said shaft, substantially as specified.

3. A machine for setting rubber tires, comprising a frame, a spindle mounted in the frame, means for adjusting said spindle vertically, means for holding the spindle as adjusted, clamping devices on the frame above the spindle, a gripping device rearward of the clamping devices, means for moving said gripping device, and a smoothing-roller above the clamping devices, substantially as specified.

4. In a machine for setting rubber tires, a frame comprising front uprights provided with vertical slots, a wheel-supporting spindle extended through said slots, a slide-plate extended into the slots and having connection with the spindle, a hand-lever, fulcrum-racks for said hand-lever, a link connection between the hand-lever and the slide-plate, means for holding the lever as adjusted, a smoothing-roller above the plate, and band-tightening devices on the frame, substantially as specified.

5. In a machine for setting rubber tires, clamping devices each having a jaw mounted on swinging arms, and a movable jaw, an angular lug on one of the jaws engaging in a slot in the other jaw, said jaws being channeled on their adjacent faces, a screw-bolt extended from the first-named jaw through the movable jaw, a clamping nut or lever engaging with said bolt and against the outer side of the movable jaw, and pins on one of the jaws for engaging in openings in the other jaw, substantially as specified.

6. In a machine for setting rubber tires, a frame, clamping devices on said frame for holding a fastening-band, a shaft mounted in the upper portion of a standard of the frame and adjustable longitudinally therein, a latch-plate mounted to swing on the standard and adapted to engage in an annular channel formed in the shaft, and a smoothing-roller attached to said shaft, substantially as specified.

7. In a machine for setting rubber tires, a frame, a spindle for supporting a wheel, a smoothing-roller adjustable laterally of the frame, clamping devices on the frame, a gripping device, a winding-drum mounted in the frame, a connection between said gripping device and the winding-drum, a roller over which said connection passes, a gear-wheel on said winding-drum, a pinion engaging therewith, a crank-handle on the shaft of the pinion, a ratchet-wheel on said shaft, and a pawl for engaging with the ratchet-wheel, substantially as specified.

In testimony whereof I have signed my name to this specification in the presence of two subscribing witnesses.

JOHN M. DECKER.

Witnesses:
C. W. HATCHER,
N. J. FORD.